(12) United States Patent
Schipp et al.

(10) Patent No.: US 7,412,788 B2
(45) Date of Patent: Aug. 19, 2008

(54) DEMOLITION CLAW

(75) Inventors: Sebastian Schipp, Coesfeld (DE); Stefan Lohmann, Mülheim (DE)

(73) Assignee: Atlas Copco Construction Tools GmbH, Essen (DE)

( * ) Notice: Subject to any disclaimer, the term of this patent is extended or adjusted under 35 U.S.C. 154(b) by 375 days.

(21) Appl. No.: 11/140,339

(22) Filed: May 27, 2005

(65) Prior Publication Data

US 2006/0000125 A1 Jan. 5, 2006

(30) Foreign Application Priority Data

Jun. 8, 2004 (DE) .................... 10 2004 028 011

(51) Int. Cl.
*E02F 3/96* (2006.01)
(52) U.S. Cl. .................... 37/468; 37/406; 294/106
(58) Field of Classification Search .................. 37/406, 37/403, 404, 468, 301, 302, 414, 729, 739; 294/106, 10, 88, 68.23; 30/92, 180, 228; 241/101.73, 264, 266
See application file for complete search history.

(56) References Cited

U.S. PATENT DOCUMENTS

| | | | | |
|---|---|---|---|---|
| 3,739,823 A * | 6/1973 | Bartell | .................... | 144/24.12 |
| 3,920,137 A * | 11/1975 | McCain | ..................... | 414/697 |
| 4,355,476 A * | 10/1982 | Engkvist | ..................... | 37/406 |
| 5,060,378 A * | 10/1991 | LaBounty et al. | ............. | 30/134 |
| 5,183,216 A * | 2/1993 | Wack | ..................... | 241/101.73 |
| 5,193,873 A * | 3/1993 | Juliusz et al. | ............... | 294/106 |
| 5,474,242 A * | 12/1995 | Rafn | ..................... | 241/101.71 |
| 5,769,341 A * | 6/1998 | Morikawa et al. | ........... | 241/266 |
| 5,822,893 A * | 10/1998 | Ostermeyer | .................. | 37/406 |
| 5,946,830 A * | 9/1999 | Ostermeyer | .................. | 37/406 |
| 6,237,257 B1 * | 5/2001 | Cronk, Jr. | .................. | 37/142.5 |
| 6,328,678 B1 * | 12/2001 | Romero | ..................... | 482/106 |
| 6,766,973 B2 * | 7/2004 | Muri | ..................... | 241/101.73 |

* cited by examiner

*Primary Examiner*—Thomas A Beach
*Assistant Examiner*—Matthew R Buck
(74) *Attorney, Agent, or Firm*—Andrew Wilford

(57) ABSTRACT

A demolition claw has a support, a pivot pin mounted on the support and centered on and extending along an axis, and two jaws each having a hole through which the pivot pin extends so that the jaws can pivot on the support about the axis. The jaws have adjacent the respective holes confronting flat faces. An arcuate formation fixed on one of the faces adjacent the respective hole projects axially therefrom toward the other of the faces and is generally centered on the axis. A retaining formation fixed on the other of the faces adjacent the respective hole projects axially therefrom toward the one face, is radially offset from the arcuate formation, axially overlaps the arcuate formation, and surrounds the arcuate formation. Structure is provided on one of the jaws for preventing axial separation of the jaws.

20 Claims, 19 Drawing Sheets

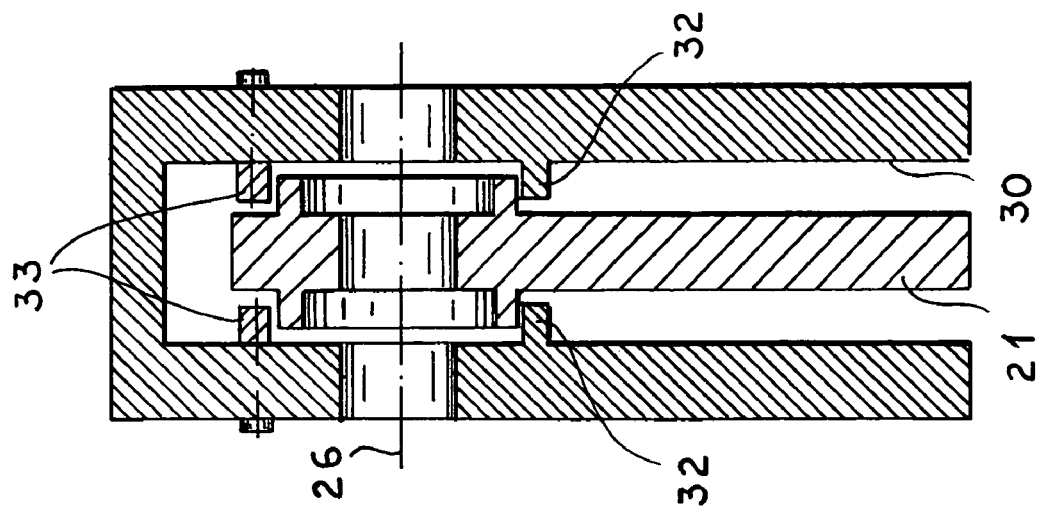
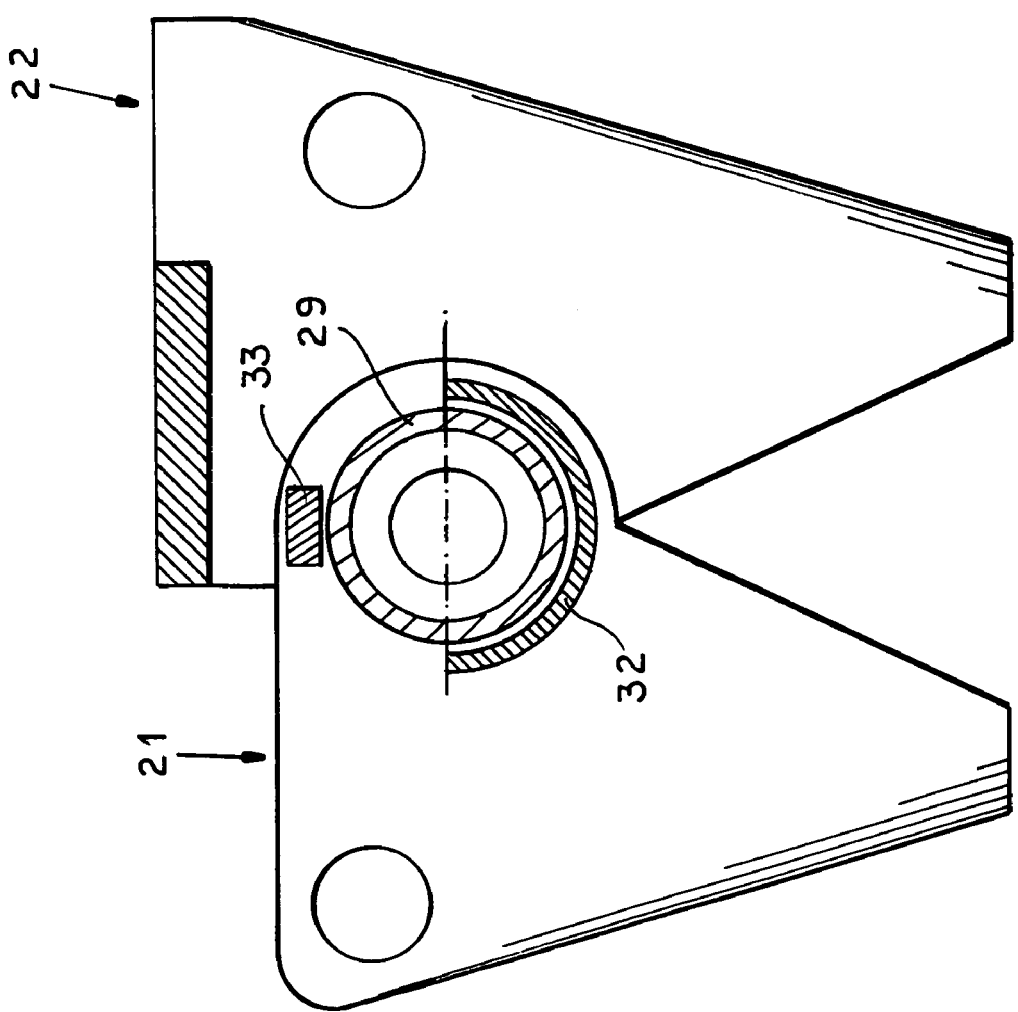

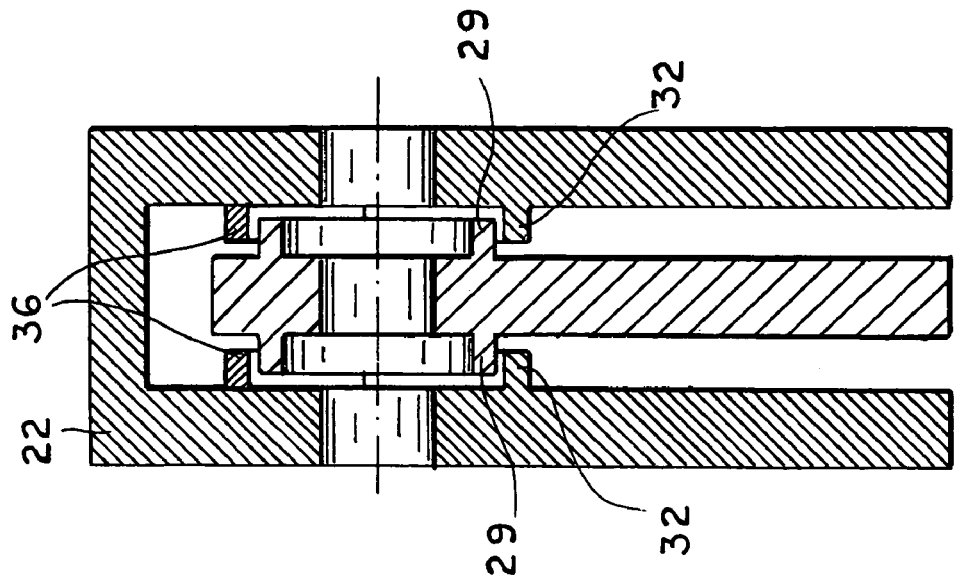
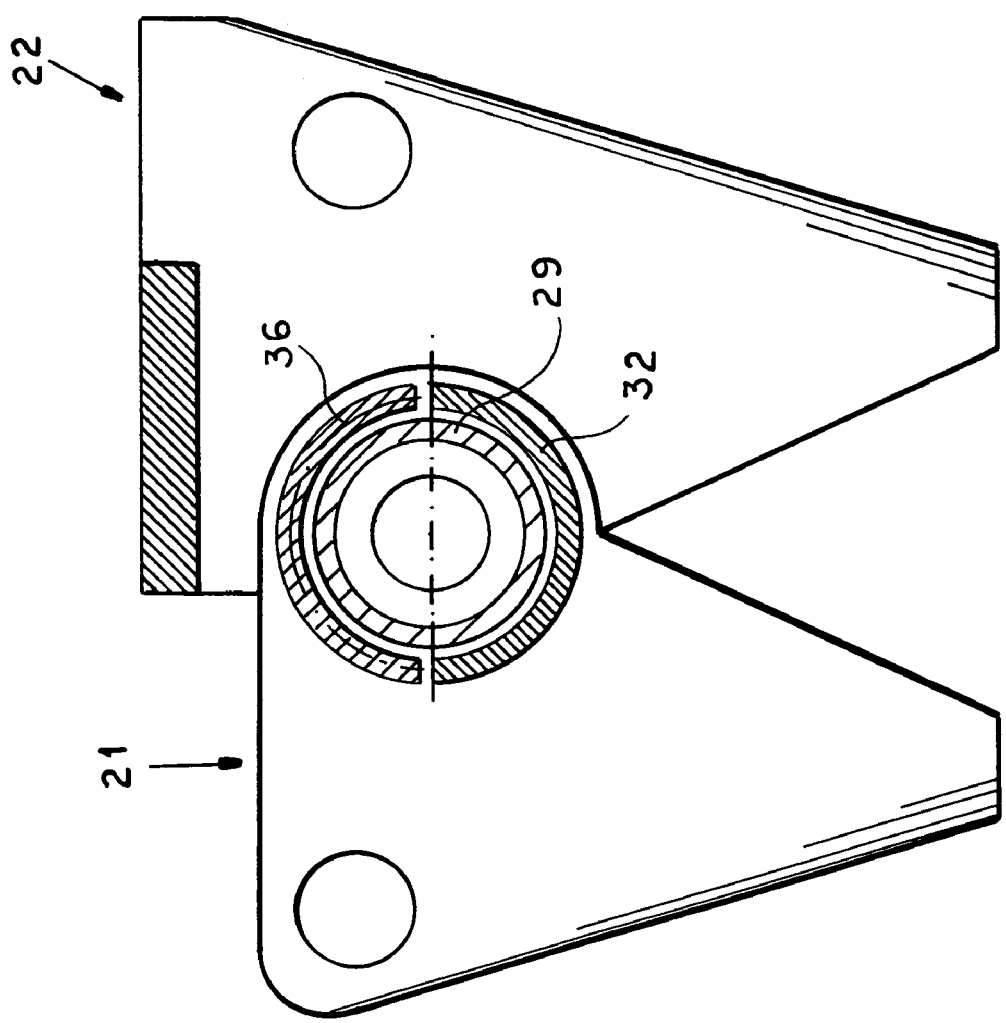

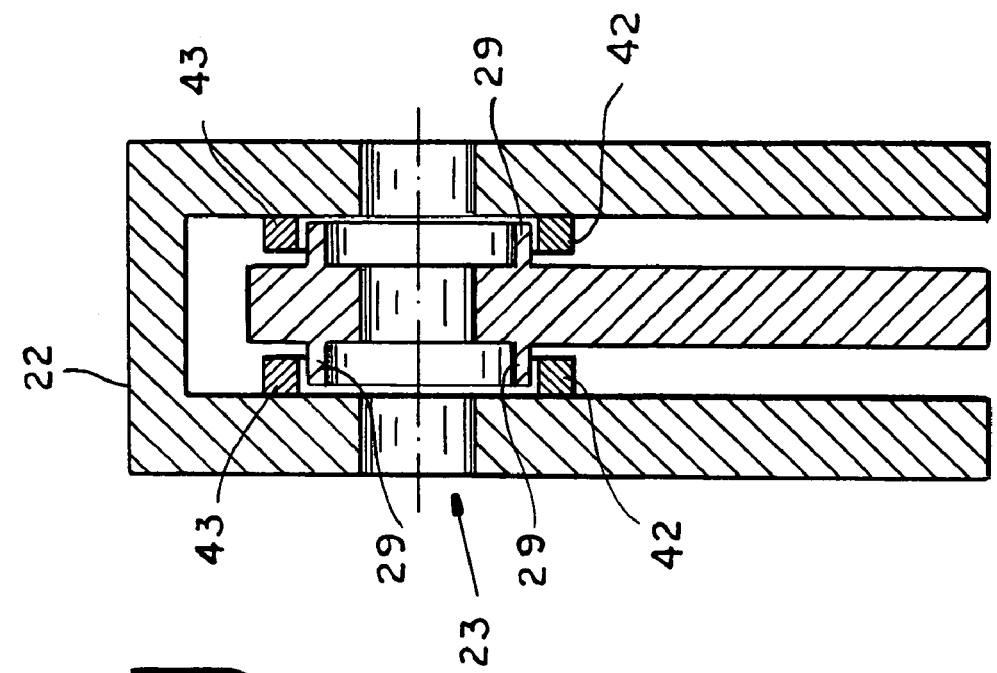
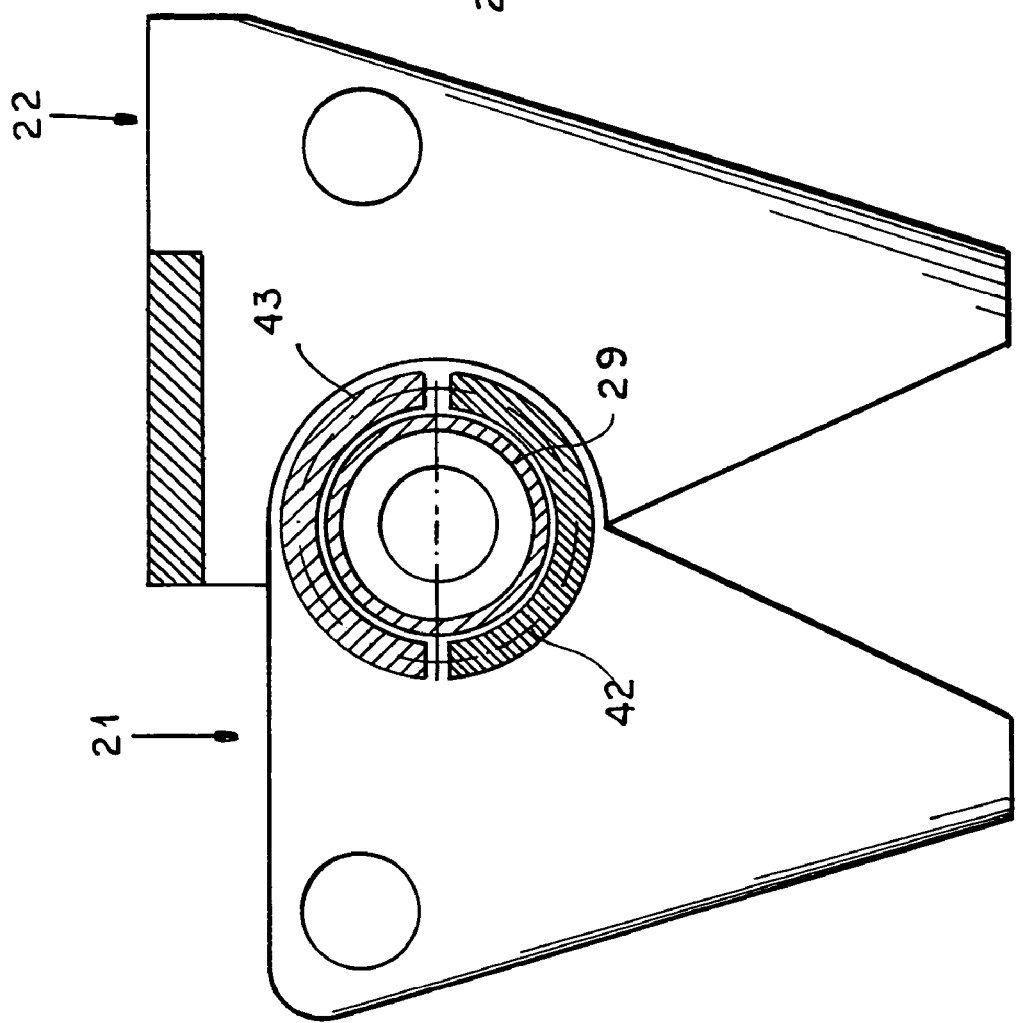

DEMOLITION CLAW

FIELD OF THE INVENTION

The present invention relates to a demolition claw. More particularly this invention concerns such a claw that is removably mounted on an outrigger arm.

BACKGROUND OF THE INVENTION

A demolition claw such as described in U.S. RE35,432 of LaBounty has a support carrying a heavy-duty pivot pin on which two massive jaws are mounted. Respective actuators are braced between the arms and the support for pivoting the jaws so that they can grasp and even cut through a workpiece. Typically one of the jaws is formed as two fixed-together and similar parts that are axially spaced and that axially flank the other jaw, 80 that when the claw is closed the other jaw actually fits axially in the one jaw.

The problem with this structure is that it is frequently necessary to take the demolition claw off the machine and replace it with another demolition claw suitable for other materials, or with another tool altogether. Once the pivot pin is pulled, the claw can typically be slipped out of the support relatively easily. Once thus removed, however, the two jaws can separate from each other. Keeping track of the jaw when its parts are separated is difficult, and reinstalling it in the arm of the equipment requires that the two jaws be fitted together and then fitted to the arm.

OBJECTS OF THE INVENTION

It is therefore an object of the present invention to provide an improved demolition claw.

Another object is the provision of such an improved demolition claw that overcomes the above-given disadvantages, in particular that is which makes it easier to handle the claw when it is not in use and that also makes it easier to install the claw on the outrigger arm for use.

SUMMARY OF THE INVENTION

A demolition claw has according to the invention a support, a pivot pin mounted on the support and centered on and extending along an axis, and two jaws each having a hole through which the pivot pin extends so that the jaws can pivot on the support about the axis. The jaws have adjacent the respective holes confronting flat faces. An arcuate formation fixed on one of the faces adjacent the respective hole projects axially therefrom toward the other of the faces and is generally centered on the axis. A retaining formation fixed on the other of the faces adjacent the respective hole projects axially therefrom toward the one face, is radially offset from the arcuate formation, axially overlaps the arcuate formation, and surrounds the arcuate formation. Structure is provided on one of the jaws for preventing axial separation of the jaws.

Thus with this system the formations will hold the jaws together even when they are not mounted on the support. Thus they can be taken off and installed easily as a pair. Since the jaws remain generally coaxial even when not installed, the job of fitting new jaws to the machine is greatly simplified since the assembly is aligned as a unit, as opposed to fitting one jaw in place and then the other. What is more, it is possible to replace only one of the jaws if desired, as for instance if the is edge of a center jaw gets dull.

In fact in accordance with the invention it is possible to form the retaining or arcuate formations on the support that holds the jaws. This way it becomes possible to pull the pivot pin and then remove only one of the jaws.

According to the invention the one jaw has a pair of fixed-together and similar parts axially flanking the other of the jaws and constituting the structure preventing axial separation of the jaws. Thus the one jaw is basically U-shaped and the other jaw pivots between its U-arms.

The arcuate formation according to the invention can be an annular ridge and the retaining formation can be at least three abutments generally angularly equispaced about the axis. When one of the abutments is removable, for instance by unbolting it, separation of the jaws is simple, while normally the two jaws are solidly connected together. Thus at least one of the abutments is a removable bolt.

The arcuate formation can also be a circularly annular ridge and the retaining formation includes a semicircular annular ridge and an abutment generally diametrally opposite the semicircular ridge. Both of the formations can be circular and centered on the axis. One of the formations is of smaller diameter than the other of the formations. Bolts can releasably retain one of the formations on the respective jaw.

In another system according to the invention the one jaw has a pair of fixed-together and similar parts axially flanking the other of the jaws. A bolt threaded axially through one of the parts and axially engageable with the other jaw prevents axial separation of the parts and of the formations, but this bolt can be backed off to allow the jaws to be separated.

According to the invention the arcuate formation according to the invention has a generally cylindrical outer surface centered on the axis. The retaining formation includes a generally cylindrical outer surface centered on the axis, a ring engaged around one of the outer surfaces and projecting axially past the other outer surface, and means for releasably clamping the ring to the one surface. Normally in accordance with the invention the one outer surface is of slightly greater diameter than the other outer surface. In this system the one outer surface can have an axial length at least equal to an axial length of the ring so that the ring can be pushed back on the one surface to allow the jaws to be separated.

The demolition claw wherein the arcuate formation includes a pair of diametrally opposite part-circular ridges each extending over less than 90° and the retaining formation includes a pair of diametrally opposite part-circular ridges each extending over substantially 90° and an abutment between the retaining-formation ridges and angularly abuttable with the arcuate-formation ridges.

The demolition claw further has according to the invention guide formations on the support for centering the jaws on the axis. These guide formations include a respective annular collar on an outside surface of each of the jaws around the respective hole and a pair of radially open arcuate seats centered on the axis and receiving the collars. To make it easy to fit the jaws to the support, the collars have beveled edges and the seat has a pair of flared flanks and an angled floor.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 3b is a cross section through the claw of FIG. 3a;

FIGS. 4a and 4b, 5a and 5b, 6a and 6b, 7a and 7b, 8a and 8b, 9a and 9b, 10a and 10b, 11a and 11b, 12a and 12b, 13a and 13b, 14a and 14b, and 15a and 15b are views like FIGS. 3a and 3b of further claws in accordance with the invention;

SPECIFIC DESCRIPTION

Figure 1:
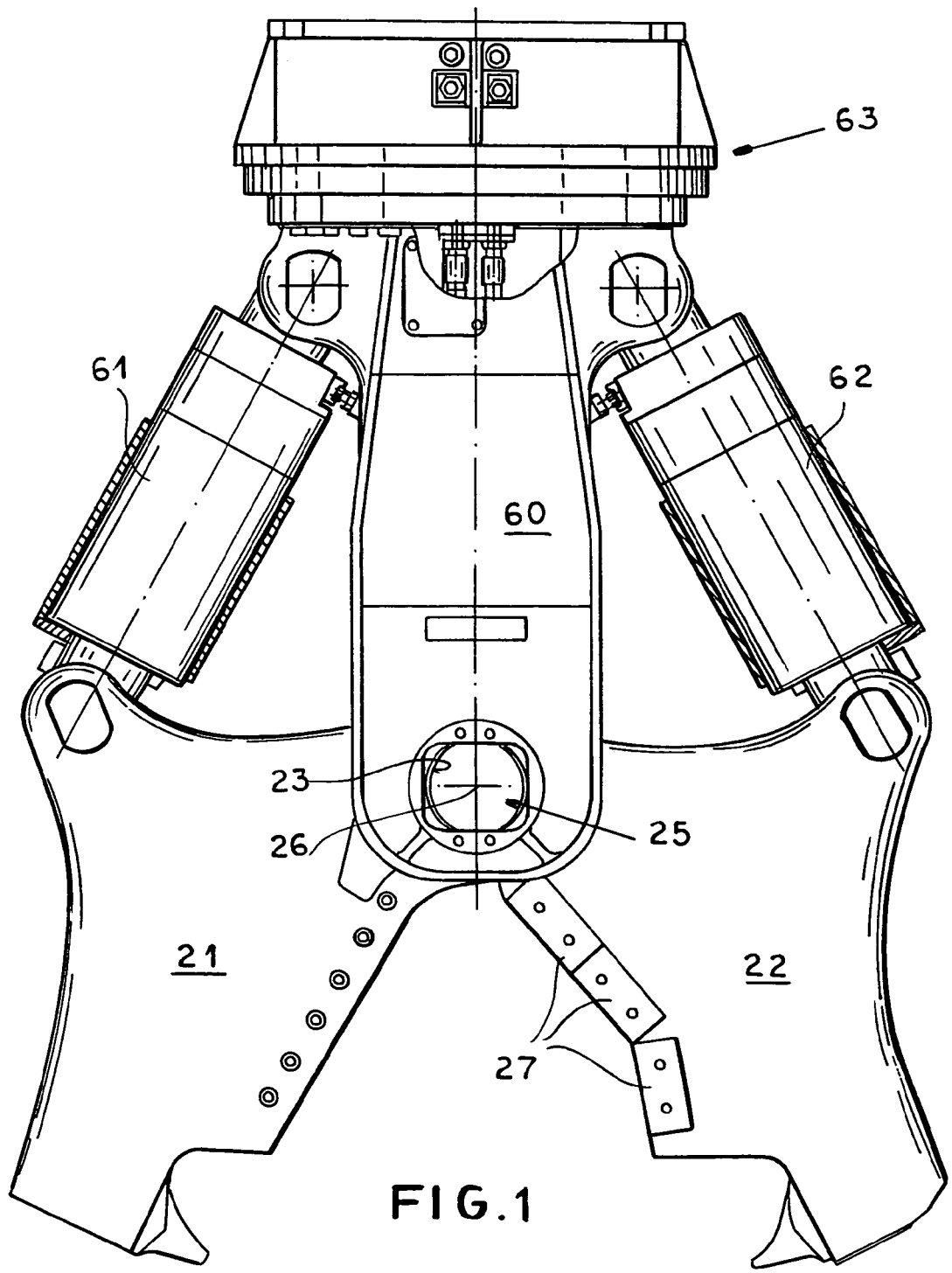
FIG. 1 is a side view of a demolition-claw assembly in accordance with the invention, with the claw open.
Figure 2:
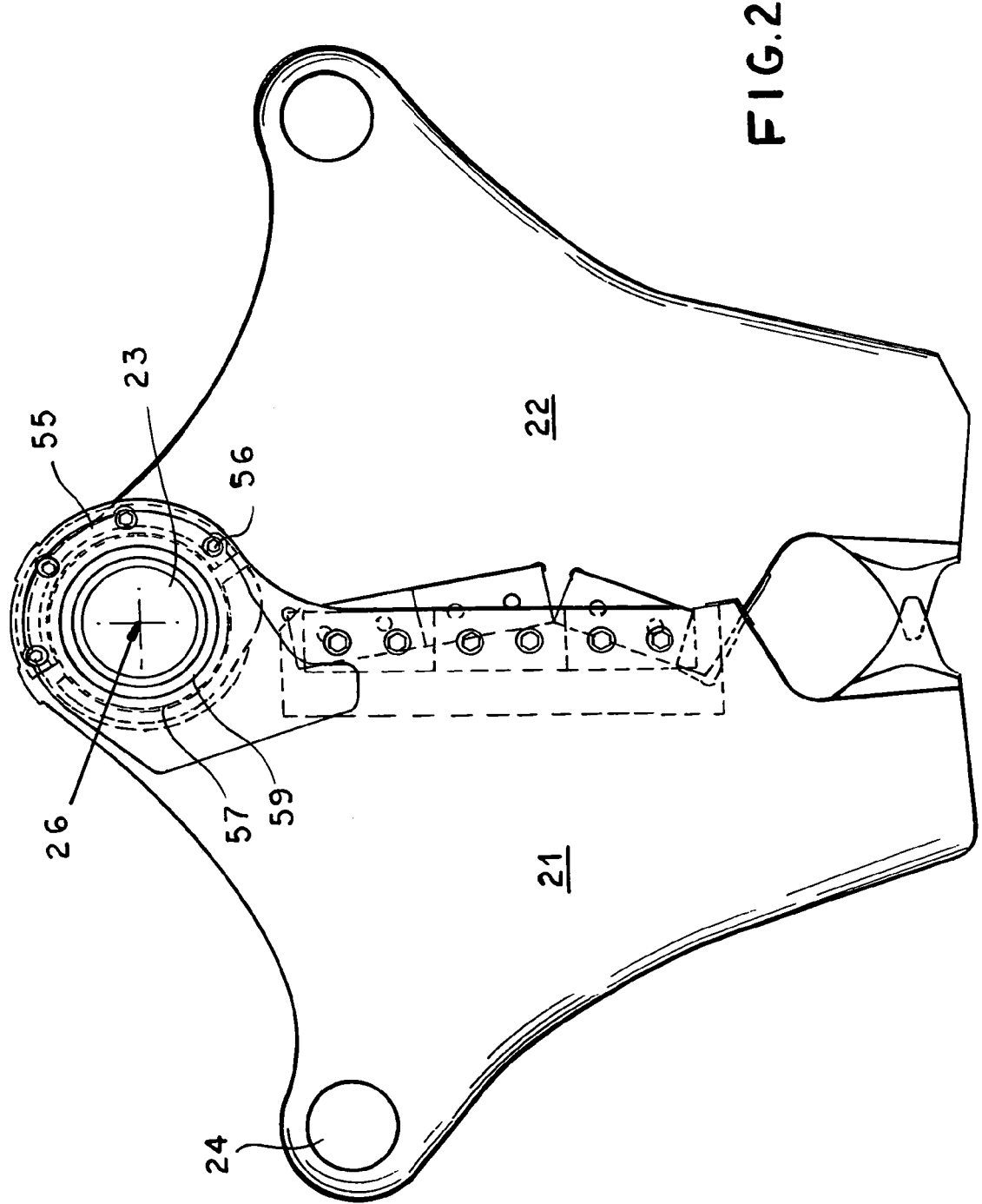
FIG. 2 is a side view of only the claw in closed condition.

As seen in FIGS. 1 and 2 a demolition claw according to the invention basically has a support 63 typically formed as the outer end of an arm of a piece of construction equipment and provided with a mount 60 holding a pivot pin 25 extending along an axis 26. A pair of massive steel jaws 21 and 22 have holes 23 fitted over the pin 25, the jaw 22 being U-shaped so that the jaw 21 can fit between its flanks or side members. Respective actuators 61 and 62 are braced between the support 63 and pivots 24 on the jaws 21 and 22 for moving them between the open position of FIG. 1 and the closed position of FIG. 2. Confronting edges of the jaws 21 and 22 can carry hard-metal inserts 27. Such a claw is used in demolition to grip and cut.

Figure 3B:
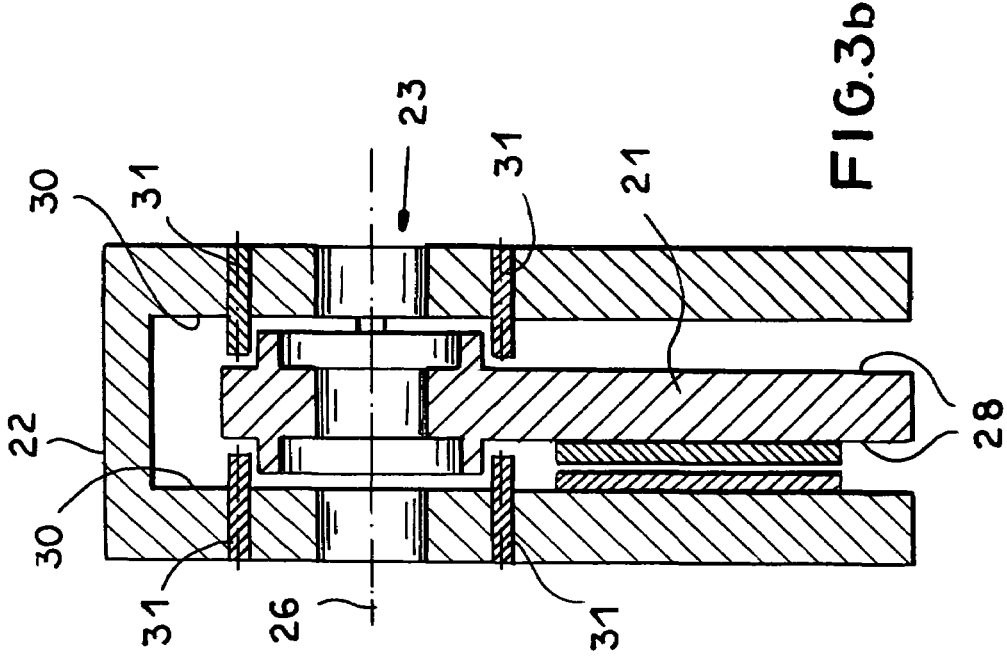
Figure 3A:
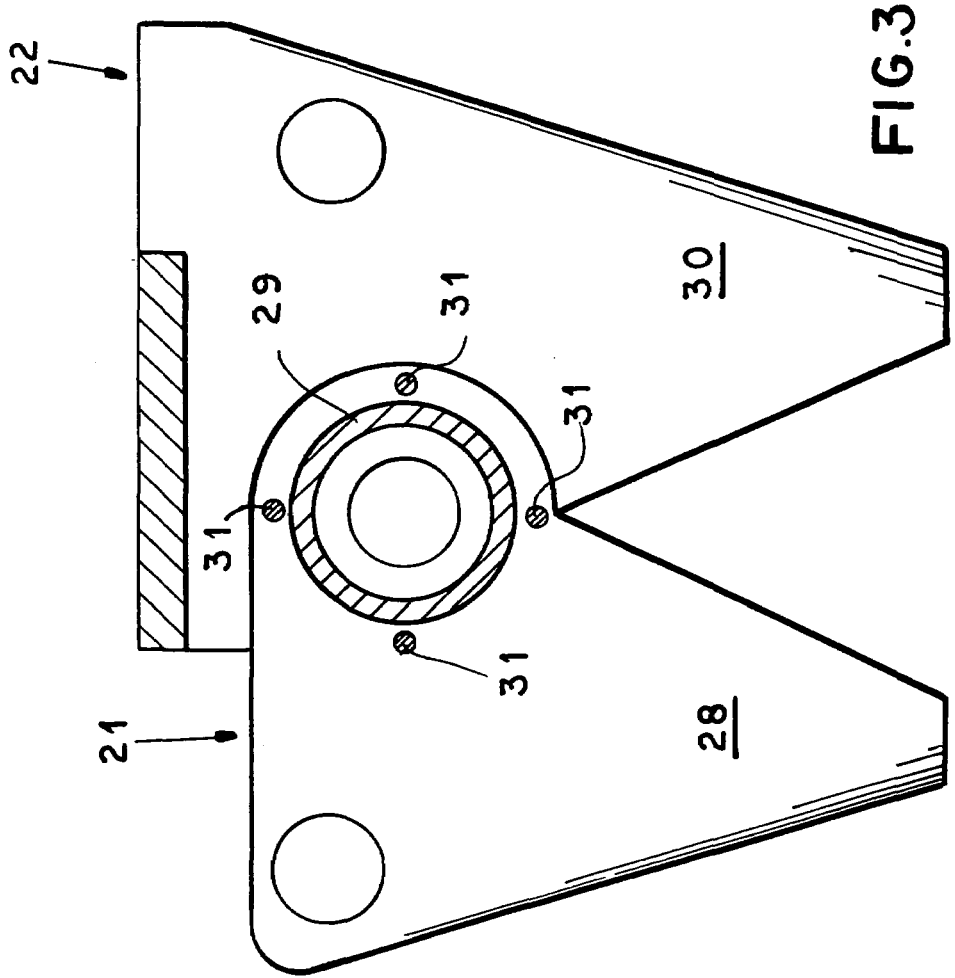
FIG. 3a is a side view partly in section through a second claw according to the invention.

In accordance with a first embodiment of the invention as shown in FIG. 2, the jaws 21 and 22 have confronting substantially planar faces 28 and 30 (see FIGS. 3a and 3b). Each face 28 is formed centered on the axis 26 with a respective circular, axially projecting, and square-section ridge 59. Each face 30 is formed with a semicircular and axially projecting square-section ridge 57 spaced radially slightly outward from half of the ridge 59 and another semicircular square-section bar 55 of the same radius of curvature as the ridge 57 is fixed by bolts 56 so that the bar 55 and ridge 57 almost completely surround the ridge 59. Since the outer edges of the ridge 59 on one Bide and ridge 57 and bar 55 on the other overlap axially, and since the jaw 21 is captured in the jaw 22, this structure 55, 57, 59 holds the two jaws 21 and 22 together at the pivot axis 26 even when there is no pivot pin 25 extending through the holes 23, and in fact the two jaws 21 and 22 are free to pivot relative to each other when not installed. To separate the two jaws 21 and 22 from each other, the bolts 56 are withdrawn to free the bar 55 and allow the jaws 21 and 22 to move radially apart.

The embodiment of FIGS. 3a and 3b has a circular ridge 29 substantially identical to the ridge 59, but the jaw 22 is provided on each face 30 with four angularly equispaced and axially extending bolts 31 that surround the ridge 29. Removal of two of the bolts 31 in axial alignment with each other allows the two jaws 21 and 22 to be separated.

In FIGS. 4a and 4b the jaw 21 has the ridge 29, but the jaw 22 is formed unitarily with a semicircular square-section ridge 32 like the ridge 57 (FIG. 2) and has an abutment block 33 that is secured by an unillustrated bolt; like the bolts 56 to the face 30 at the same radial spacing from the axis 26 as the ridge 32 and diametrally across from a center of this ridge 32. Thus the abutment 33 and ridge 32 surround the ridge 29, but removal of the abutment 33 allows the jaws 21 and 22 to be separated.

Figure 5B:
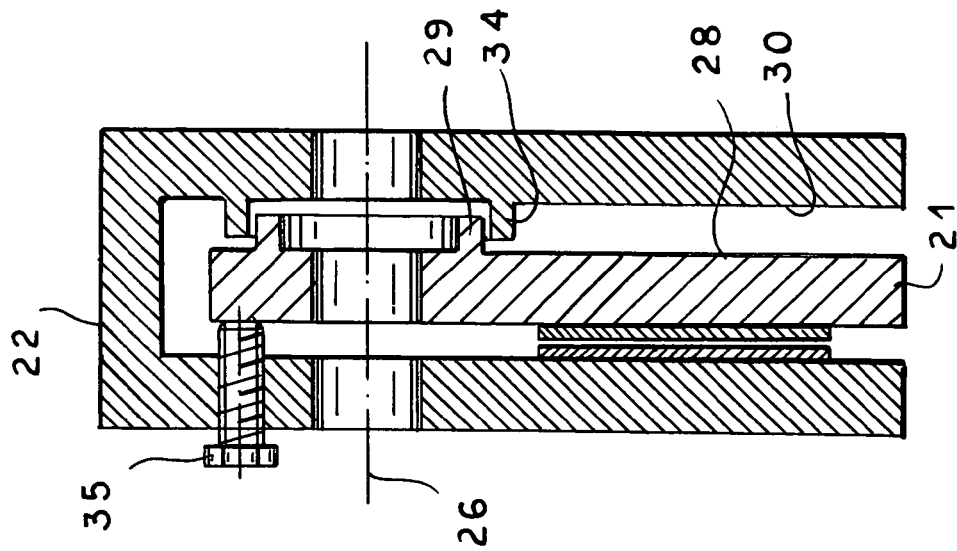
Figure 5A:
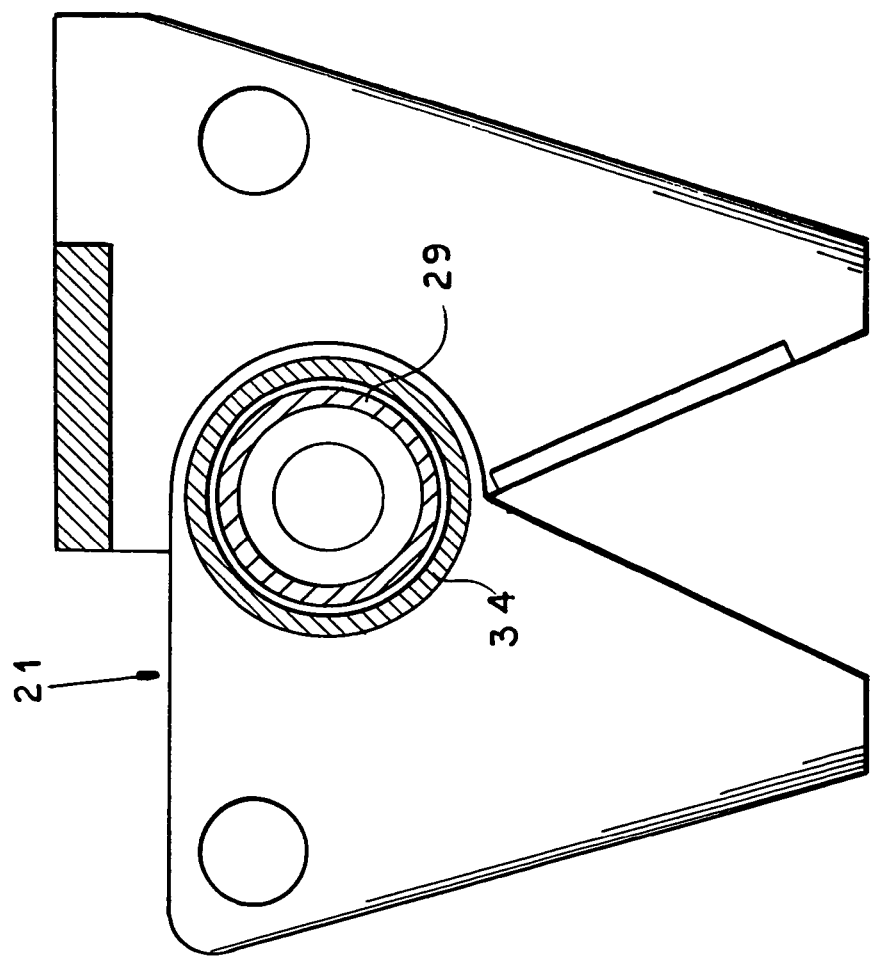

FIGS. 5a and 5b show a jaw 21 having only one face 28 provided with the ridge 29, while the confronting face 30 is formed with a similar ridge 34 of greater diameter, so the ridge 29 is captured in the ridge 34. Here a bolt 35 serves as means preventing axial shifting of the jaw 21 so that the two ridges 29 and 34 always axially overlap. Removal of this bolt 35 allows the jaw 21 to be pulled axially back to disengage its ridge 29 from the ridge 34.

FIGS. 6a and 6b show a system similar to that of FIG. 2. More particularly, each face 28 is formed centered on the axis 26 with the respective circular and square-section ridge 29. Each face 30 is formed with a semicircular square-section ridge 32 spaced radially slightly outward from half of the ridge 29 and another semicircular square-section bar 36 of the same radius of curvature as the ridge 29 is fixed by bolts so that the bar 36 and ridge 32 almost completely surround the ridge 59.

Figure 7B:
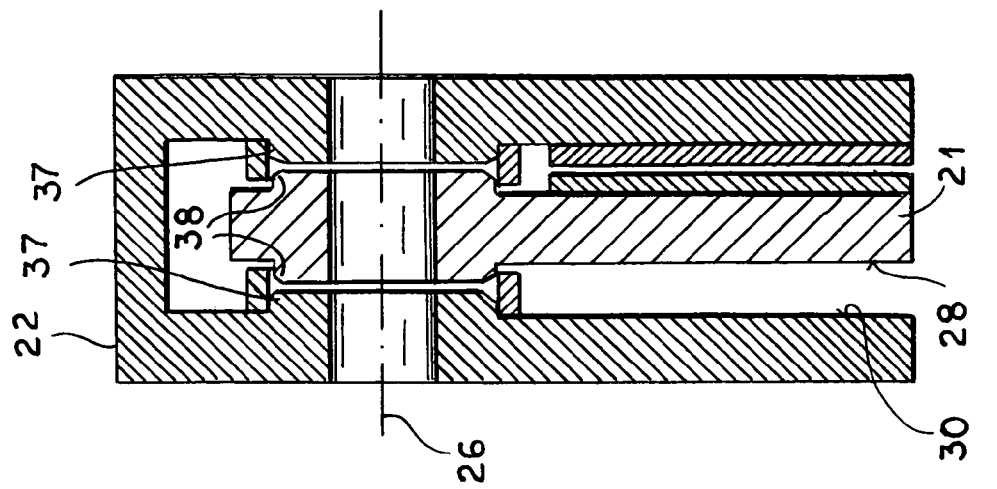
Figure 7A:
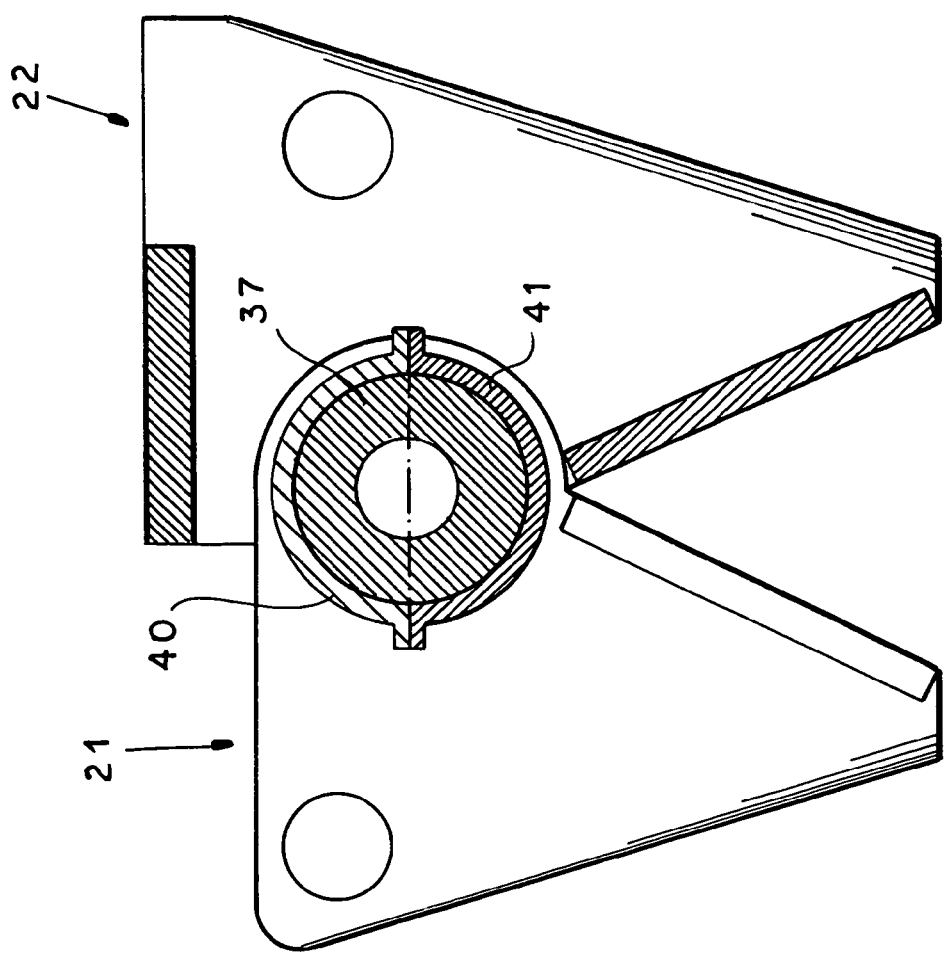

In FIGS. 7a and 7b the faces 28 are formed with annular bumps or ridges 38 centered on the axis 26 and the faces 30 with similar bumps or ridges 37 also centered on the axis 26, but in each pair of ridges 37 and 38 one of the ridges is of slightly larger diameter. A ring having two parts 40 and 41 is bolted to the larger of the two ridges 37 and 38 so as to form on its own a ridge that projects axially past and surrounds the smaller of the two ridges 37 and 38, thereby pivotally coupling the jaws 21 and 22 together. Unbolting the two ring halves 40 and 41 from each other allows the jaws 21 and 22 to be separated. The inner peripheries of the ridges 37 and 38 form the holes 23.

The arrangement of FIGS. 8a and 8b has a jaw 21 with the ridge 29, but the jaw 22 has on each face 30 a pair of bolted-on semicircular ridge-forming bars 42 and 43 that coaxially surround the ridge 29.

Figure 9B:
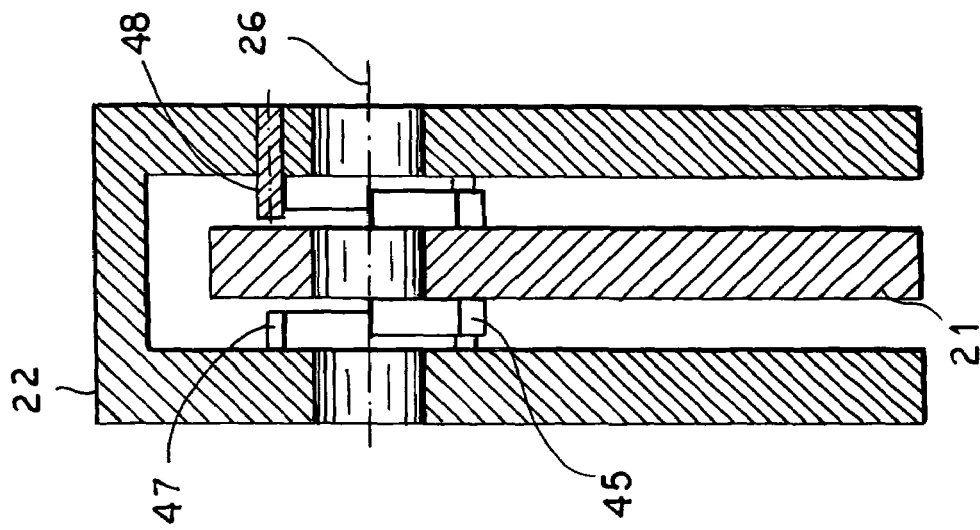
Figure 9A:
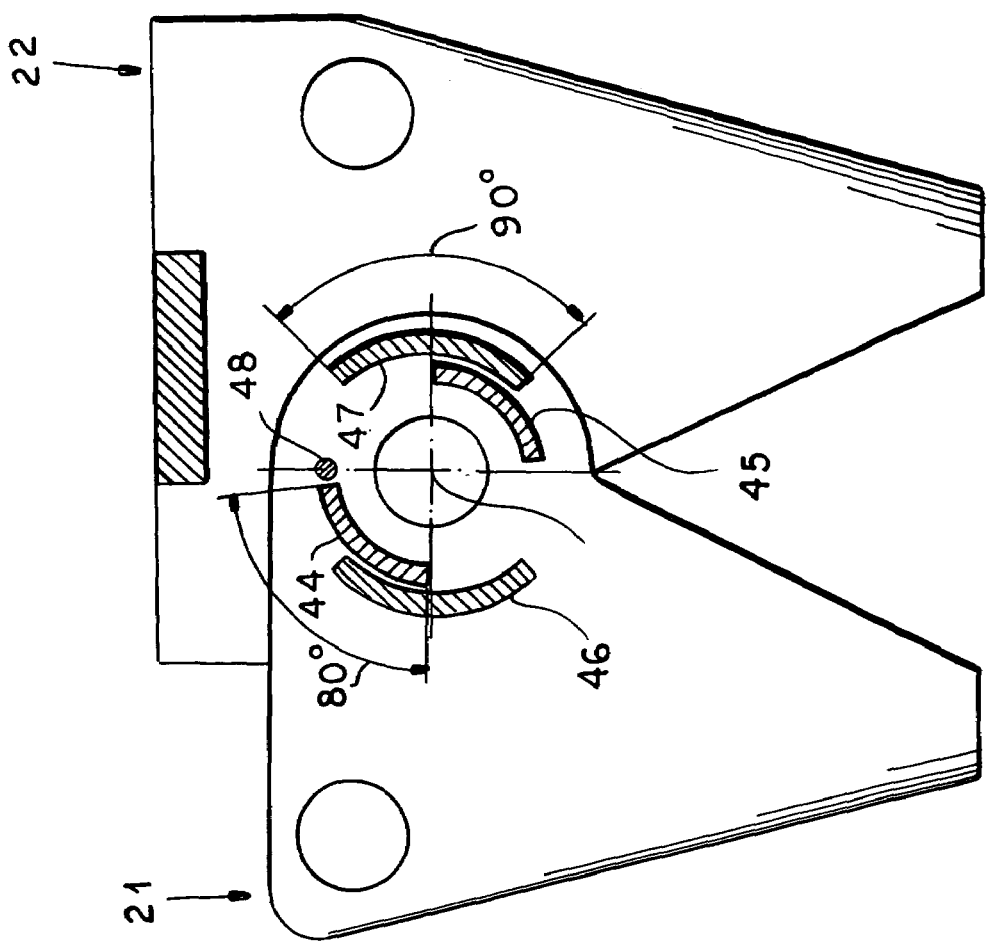

In FIGS. 9a and 9b the jaw 21 is formed on each face 28 with two diametrally opposite circularly arcuate ridges 44 and 45 extending over 10° to 90°. The jaw 22 is formed on each face with two ridges 46 and 47 that are also diametrally opposite and that extend over at least 90°. The jaw 22 also has a stop pin 48 spaced identically from the axis 26 as the ridges 44 and 45 and equispaced between ends of the two ridges 46 and 47 so that this pin 48 limits pivoting of the jaw 21 relative to the jaw 22 through about 90°. Only by removing the pin 48 can the jaw 21 be pivoted enough to pass the ridges 44 and 45 radially between the ridges 46 and 47 so as to separate the jaws 21 and 22.

Figure 10B:
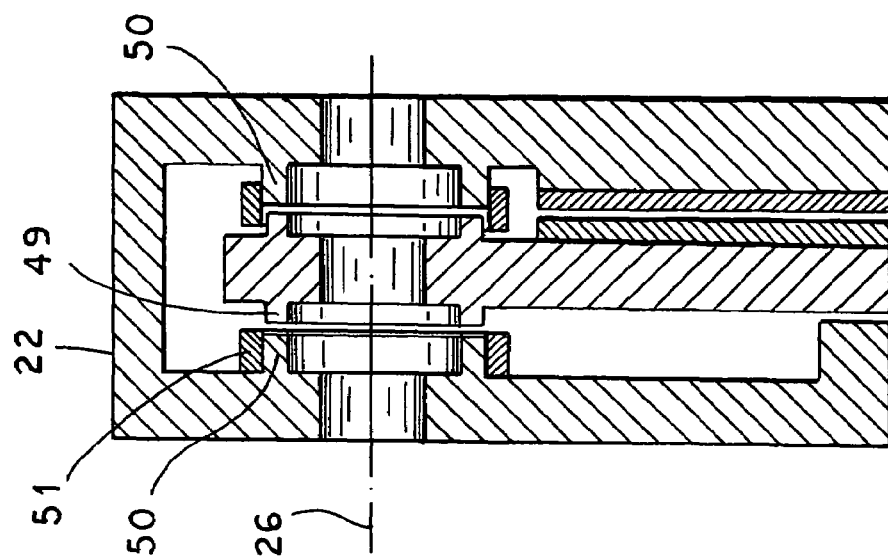
Figure 10A:
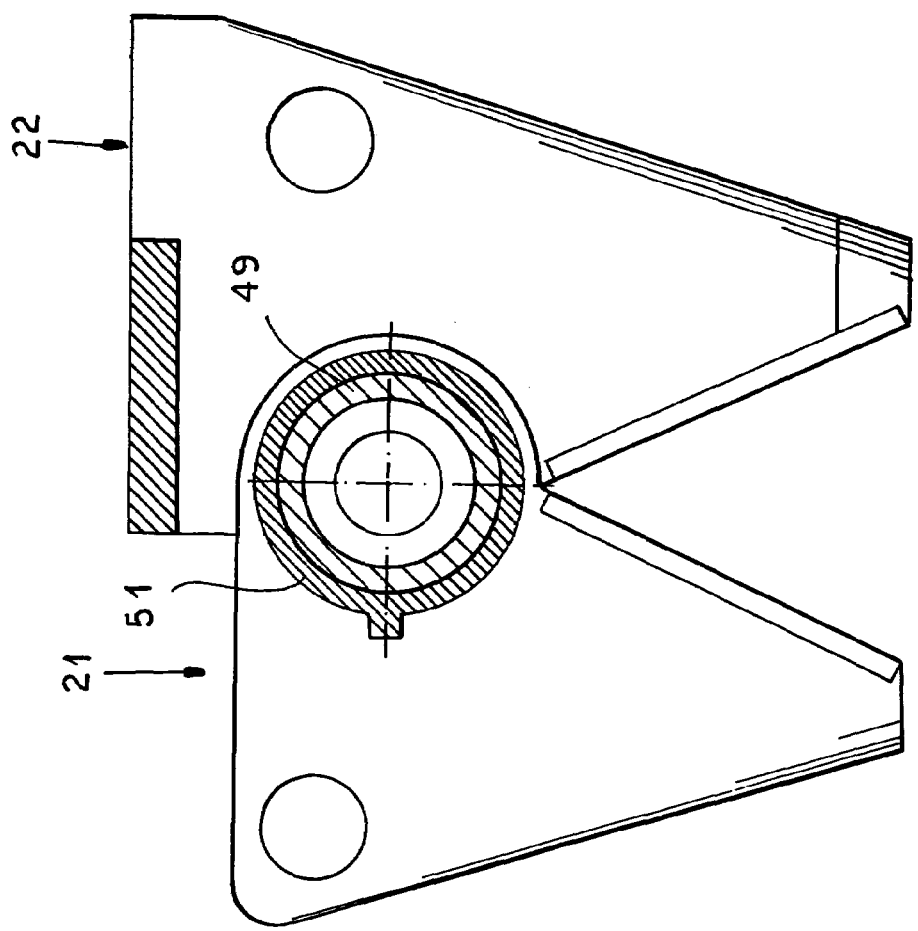

FIGS. 10a and 10b shows jaws 21 and 22 whose faces 28 and 30 are formed with circularly annular ridges 49 and 50, that are axially aligned with each other, but: the ridges 50 are slightly greater in diameter than the ridges 49 and also axially slightly longer. A one-piece ring 51 with a clamping device is clamped tightly to each of the larger ridges 50. During normal operation the rings 51 are set to project past the ends of the respective ridges 50 so as to overlap the ridges 49 and connect the jaws 21 and 22 together. Loosening of the rings 51, however, allows them to be pushed back and no longer overlap the ridges 49, thereby allowing the jaw 21 to be pulled out from between the sides of the jaw 22.

Figure 11B:
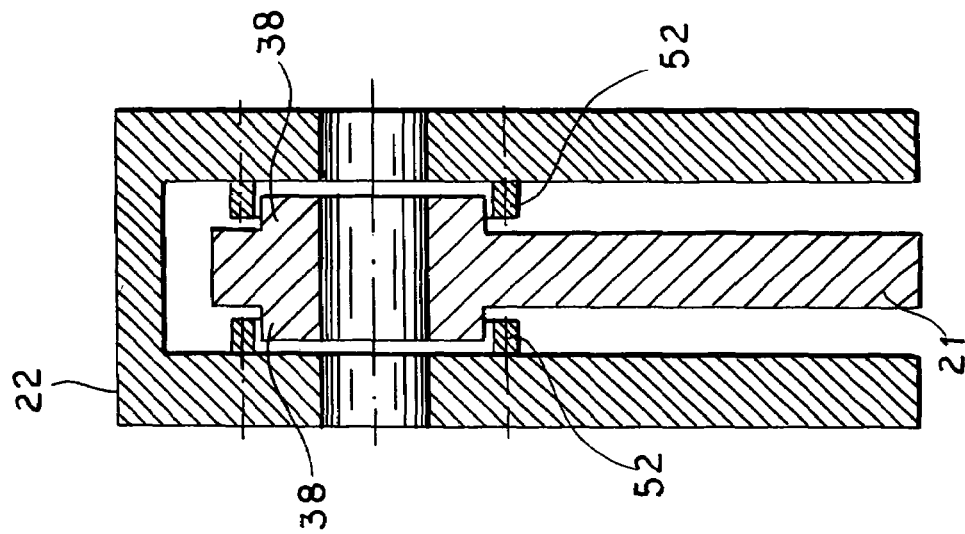
Figure 11A:
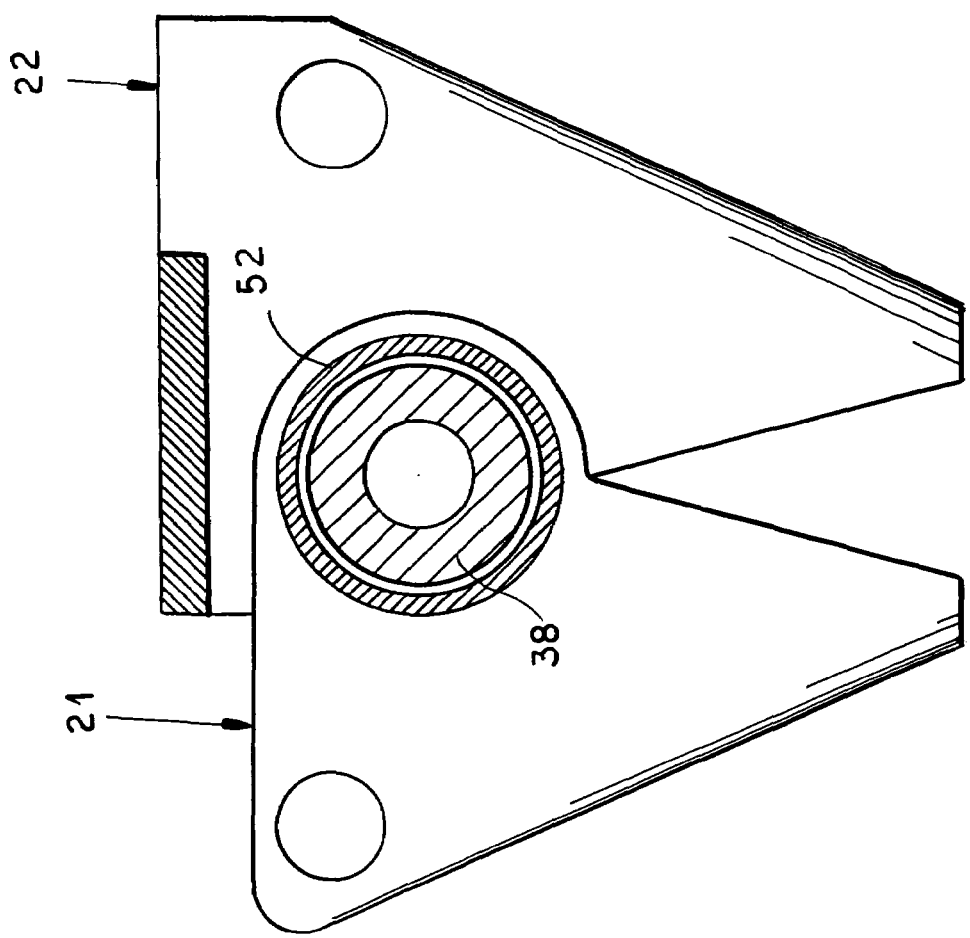
Figure 12B:
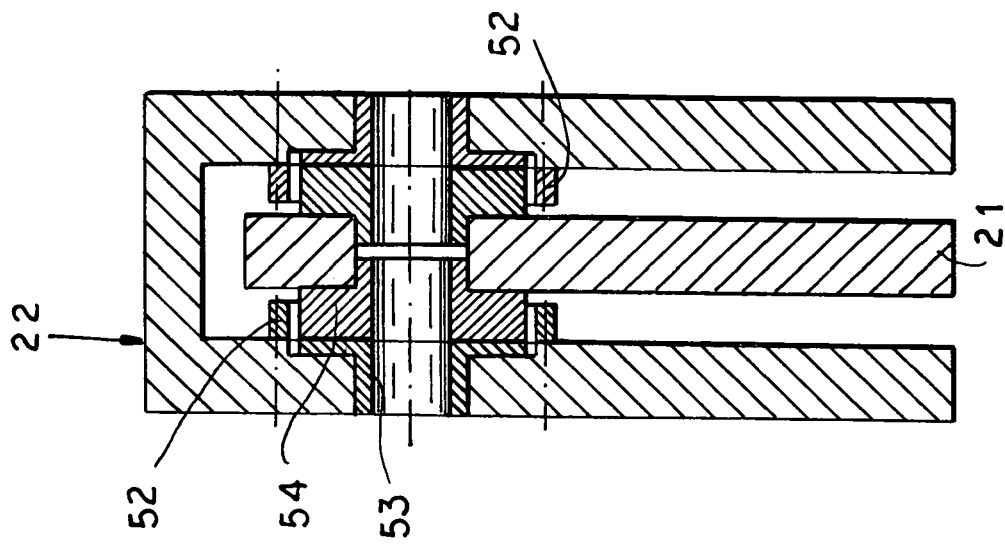

The system of FIGS. 11a and 12b is simple, with the center jaw 21 being formed with the two bumps or ridges 38 and the faces 30 being provided with bolt-on, rings 52. Both the rings 52 have to be unbolted to allow the jaws 21 and 22 to be separated.

Figure 12A:
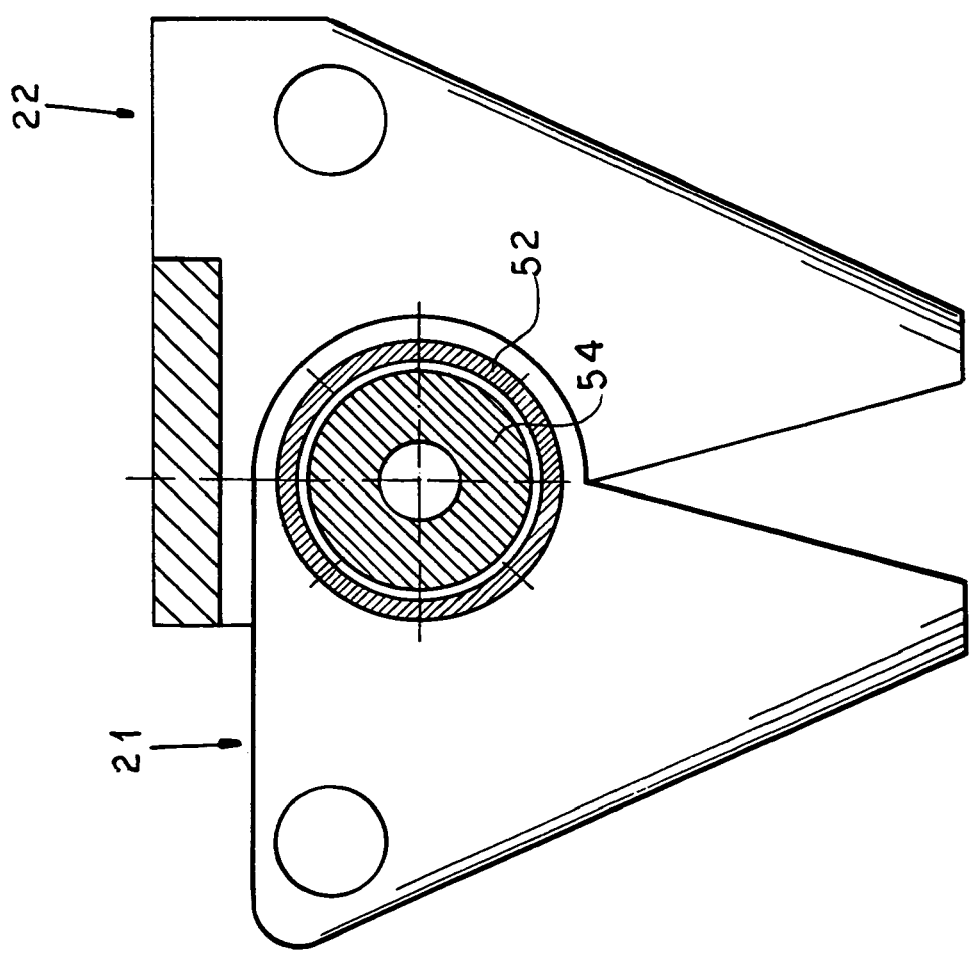

In FIGS. 12a and 12b the same bolt-on rings 52 as in FIGS. 11a and 11b are used, but the jaw 21 is provided with two inserts 54 that fit in the rings 52. T-section liner tubes 53 are fitted in the jaw 22 and the parts 53 and 54 form the bores is 23.

Figure 13B:
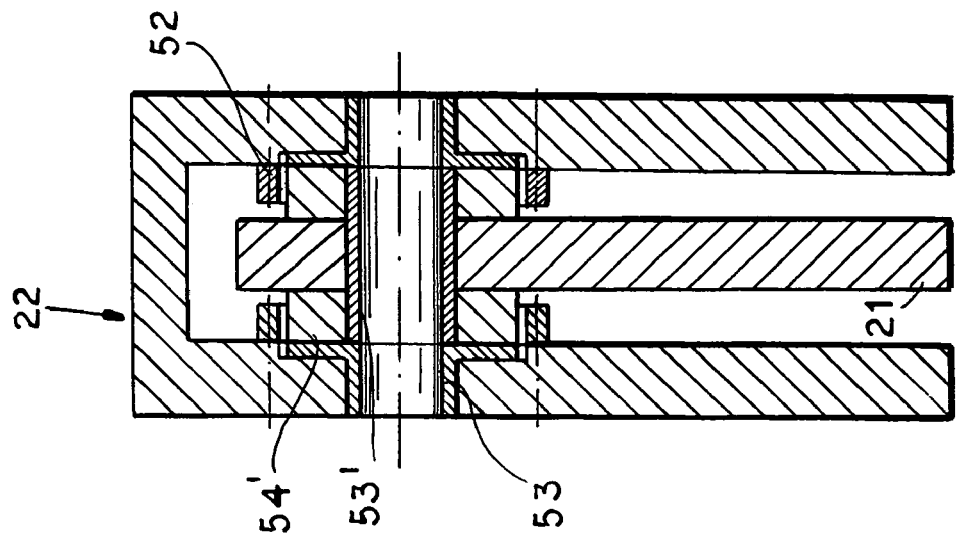
Figure 13A:
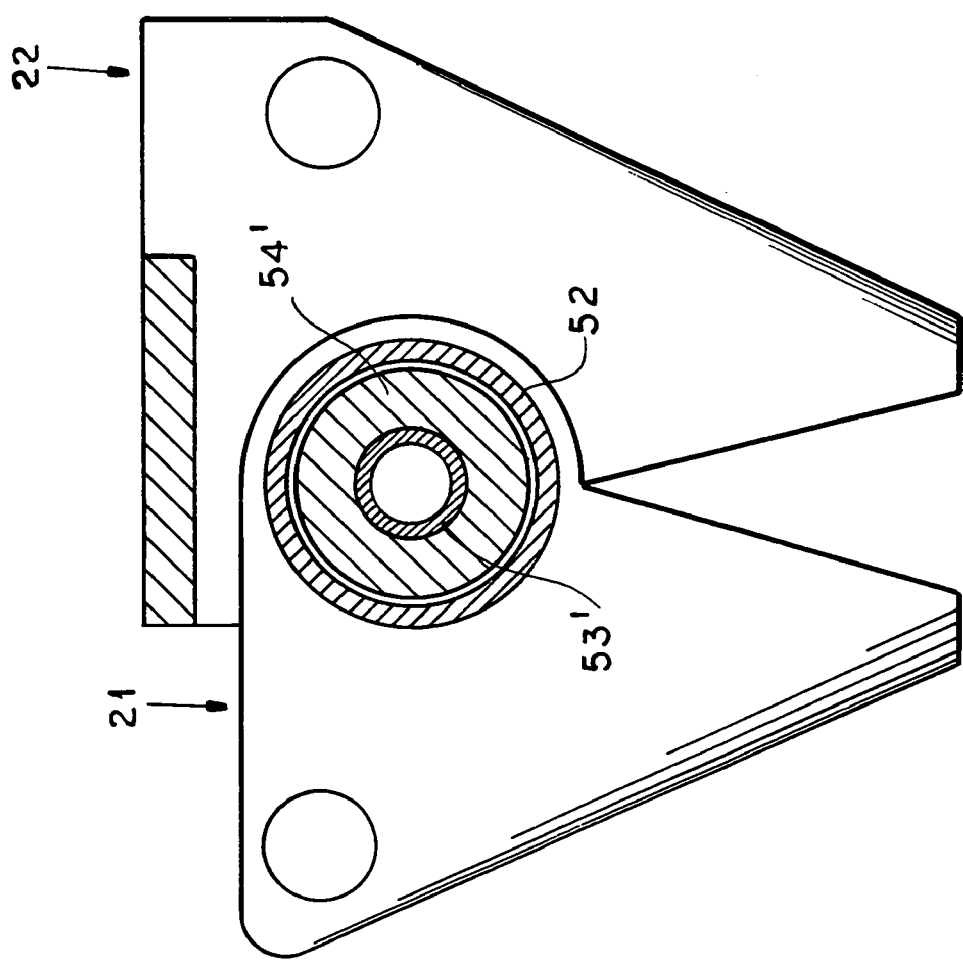
Figure 14B:
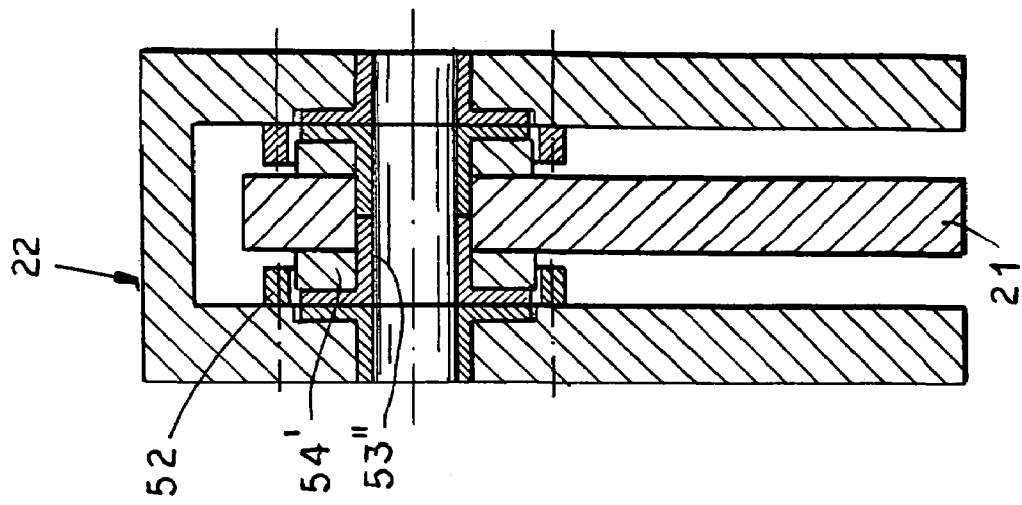
Figure 14A:
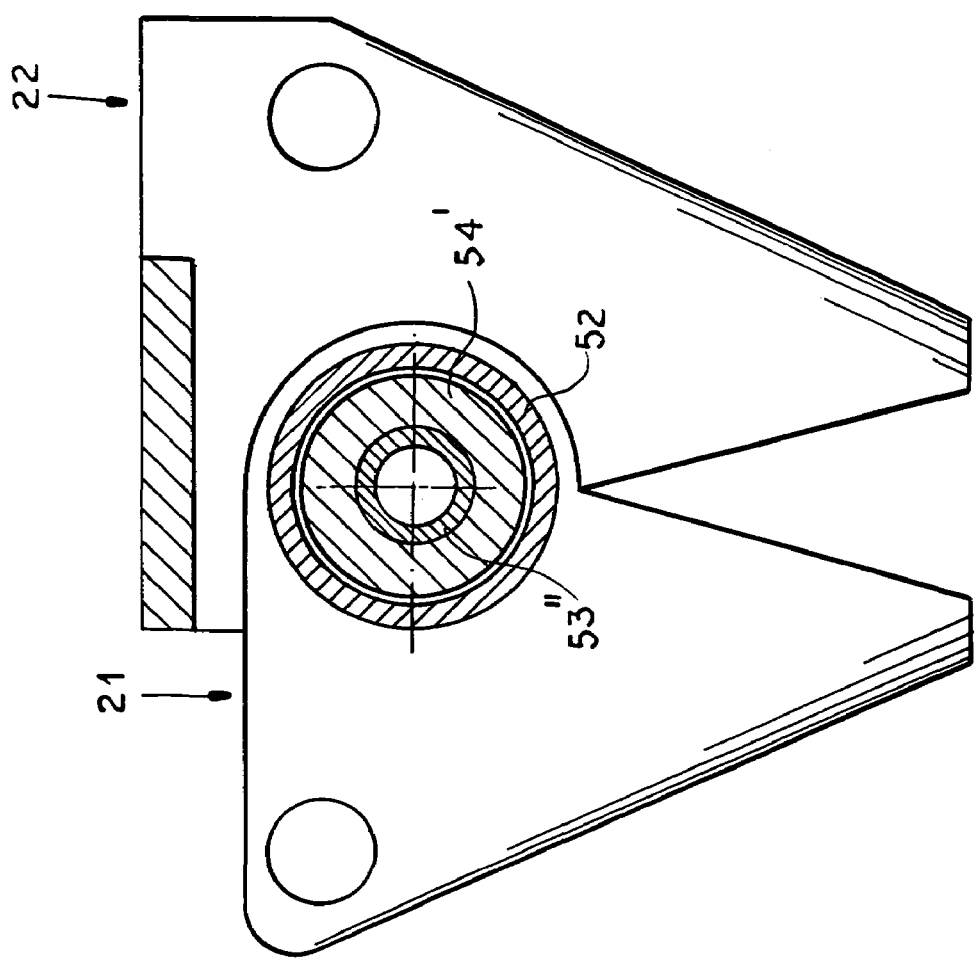

The system of FIGS. 13*a* and 13*b* has a liner tube 53' in the jaw 21 holding rings 54' in place inside rings 52. The assembly of FIGS. 14*a* and 14*b* is substantially the same, but the part 53" is of T-shape like the part 53, with planar flanges of the parts 53 and 53*n* axially confronting each other.

Figure 15B:
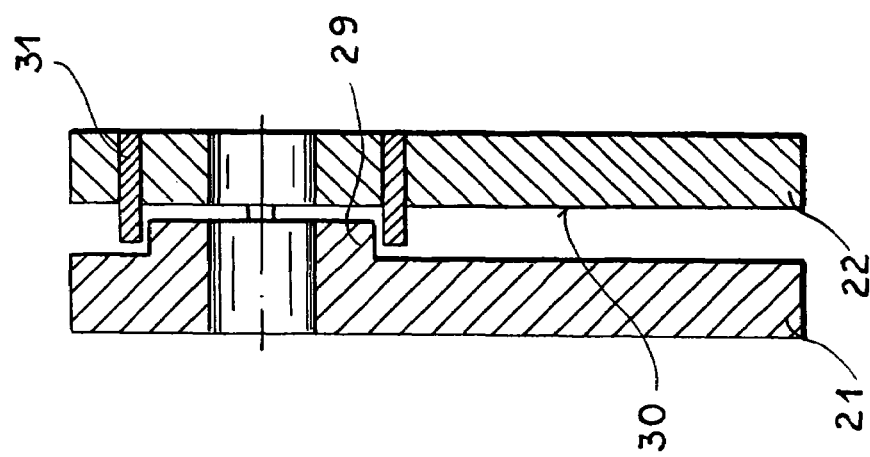
Figure 15A:
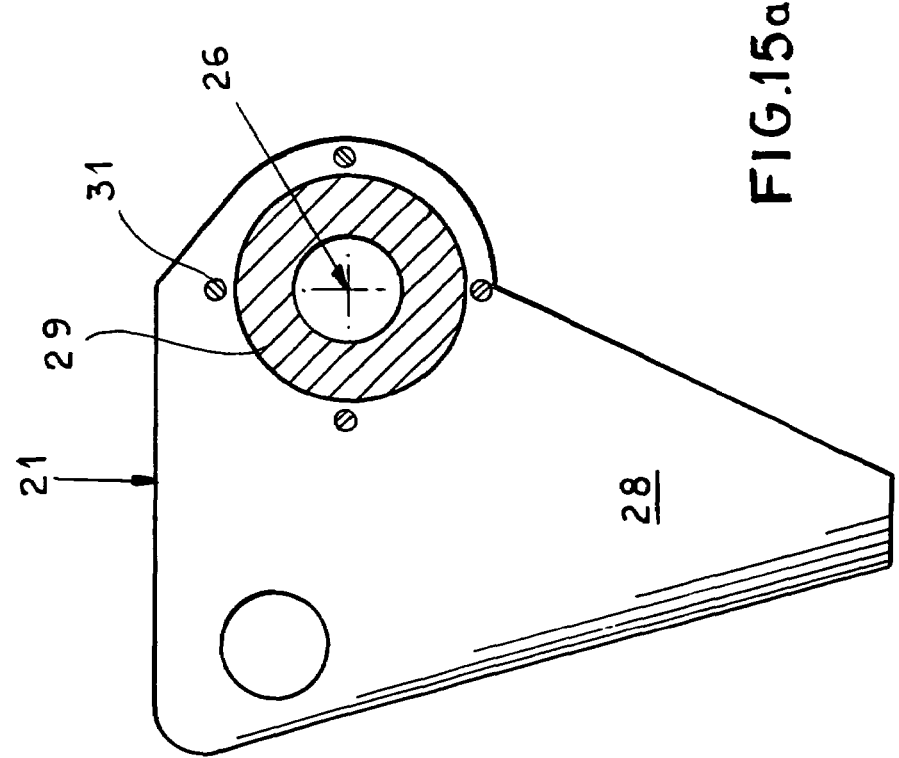
Figure 16:
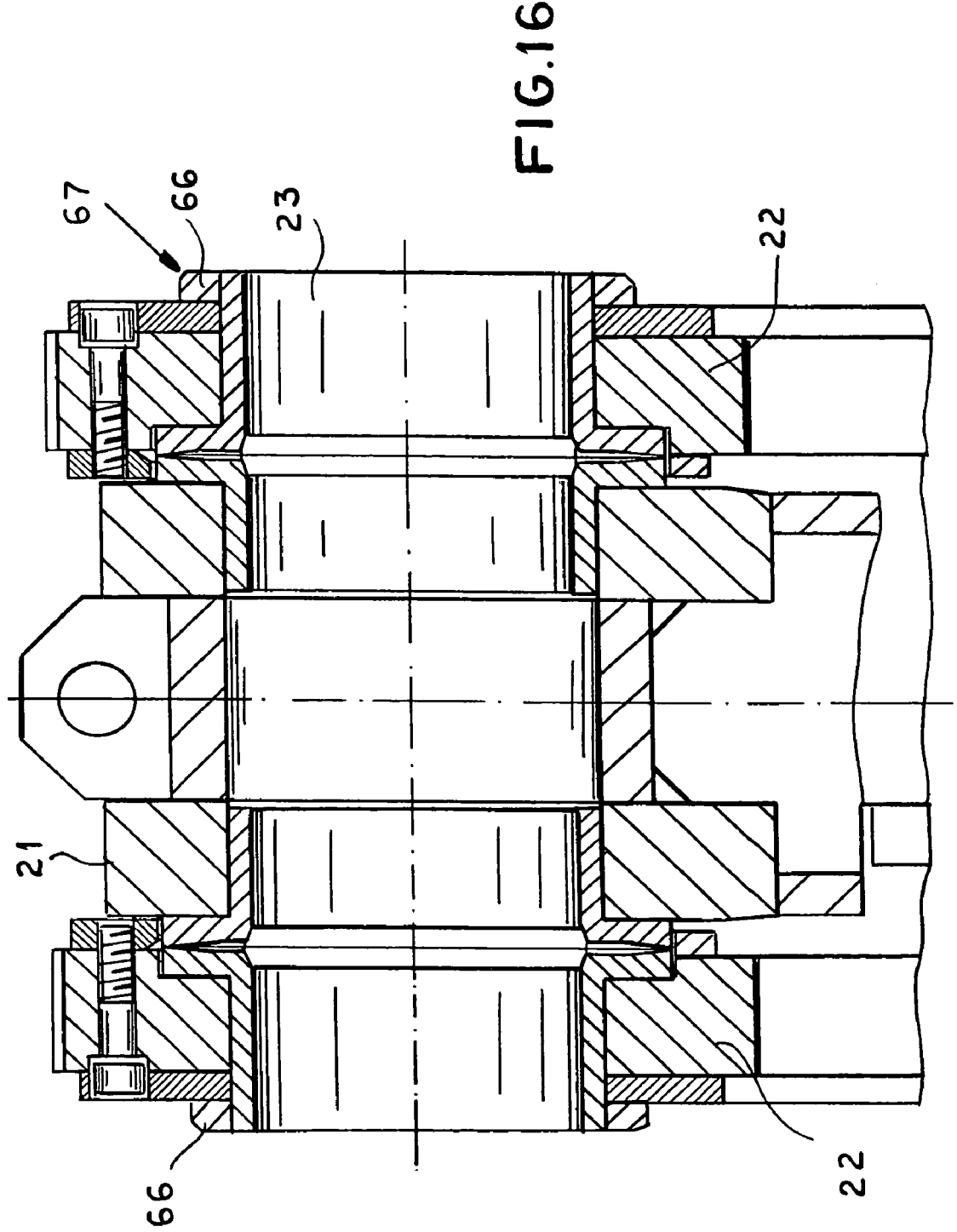
FIG. 16 is an axial section through another claw joint according to the invention.

FIGS. 15*a* and 15*b* show an arrangement like that of FIGS. 3*a* and 3*b*, except here the ridge 29 is of greater thickness so its inner periphery forms the bore 23.

FIGS. 16, 17, 18, and 20 show an arrangement where the outer jaw 22 is provided on its outer faces around each hole 23 with a centering ring 66 having a beveled outer edge 67. The support 60 is provided on its inner faces with centering elements having a semicircular part 68 centered on the axis 26, a pair of diverging flanks 69, and a floor 71 that is angled so that, when the jaw assembly 21, 21 is push between the sides of the support 60 the rings 66 ride on the flanks 69 and surfaces 71 into a position aligned in the bore. Once the pin 25 is inserted the rings 66 are held out of radial contact with the surface 68, as they are of slightly smaller radius of curvature.

Figure 17:
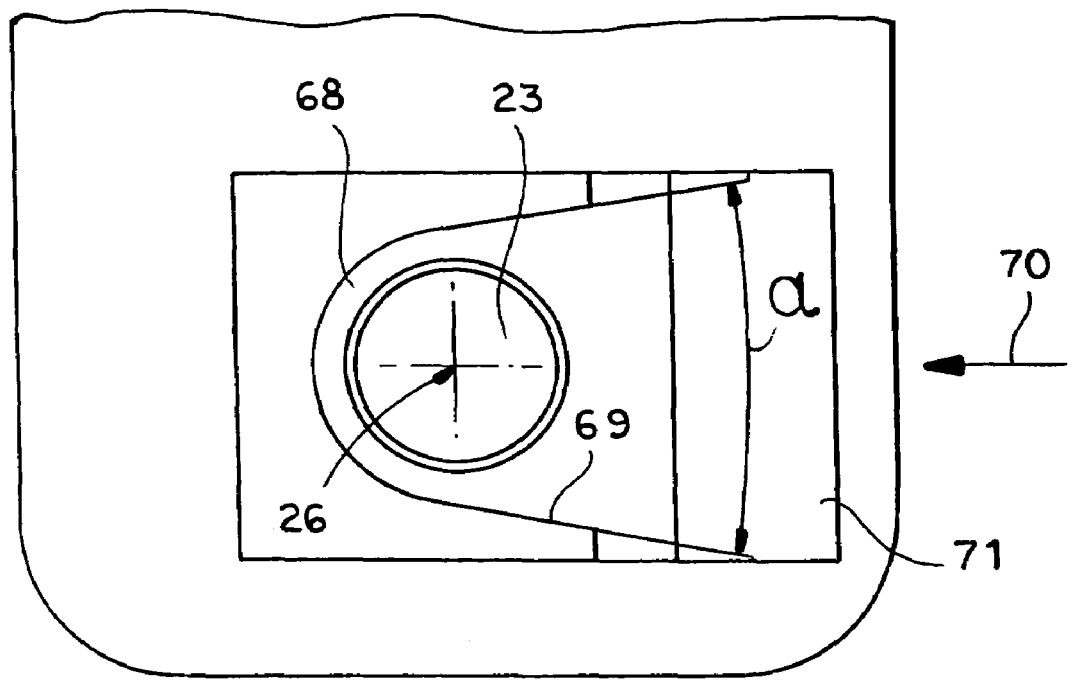
FIG. 17 is an axial end view of a detail of the claw assembly usable with the claw of FIG. 16.
Figure 18:
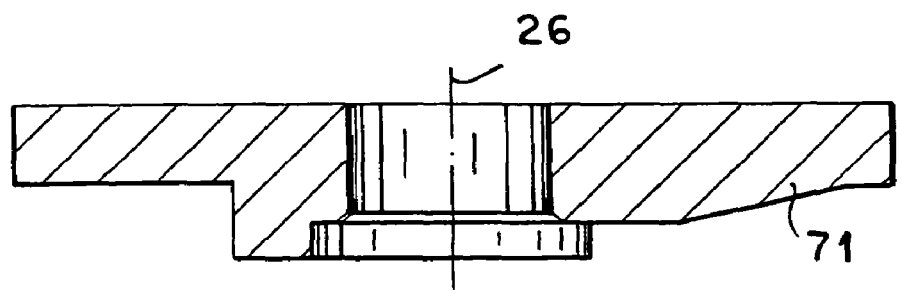
FIG. 18 is an axial section through the structure of FIG. 17.
Figure 19A:
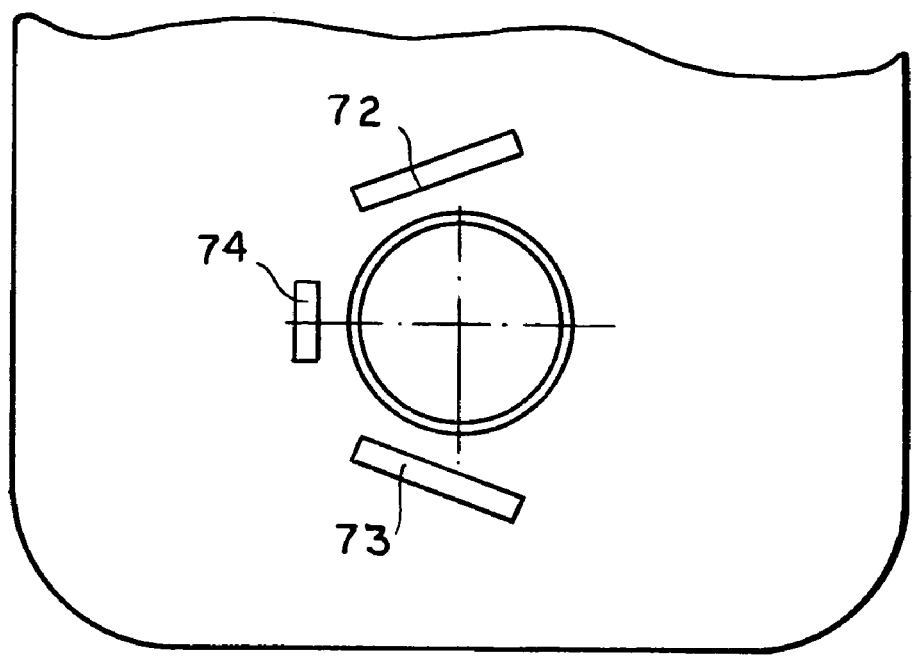
FIGS. 19a and 19b are views like FIGS. 17 and 18 of another variant on the claw assembly.
Figure 19B:
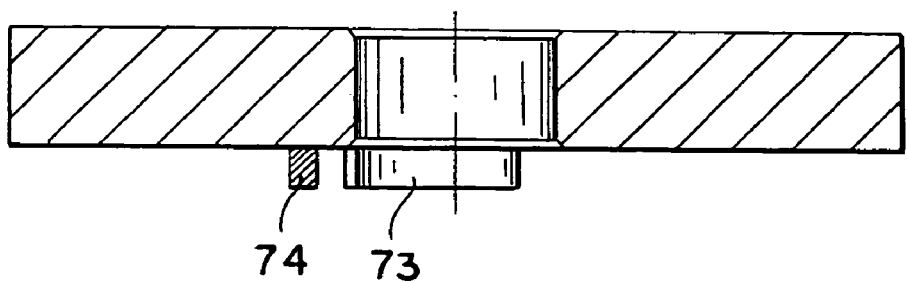
Figure 20:
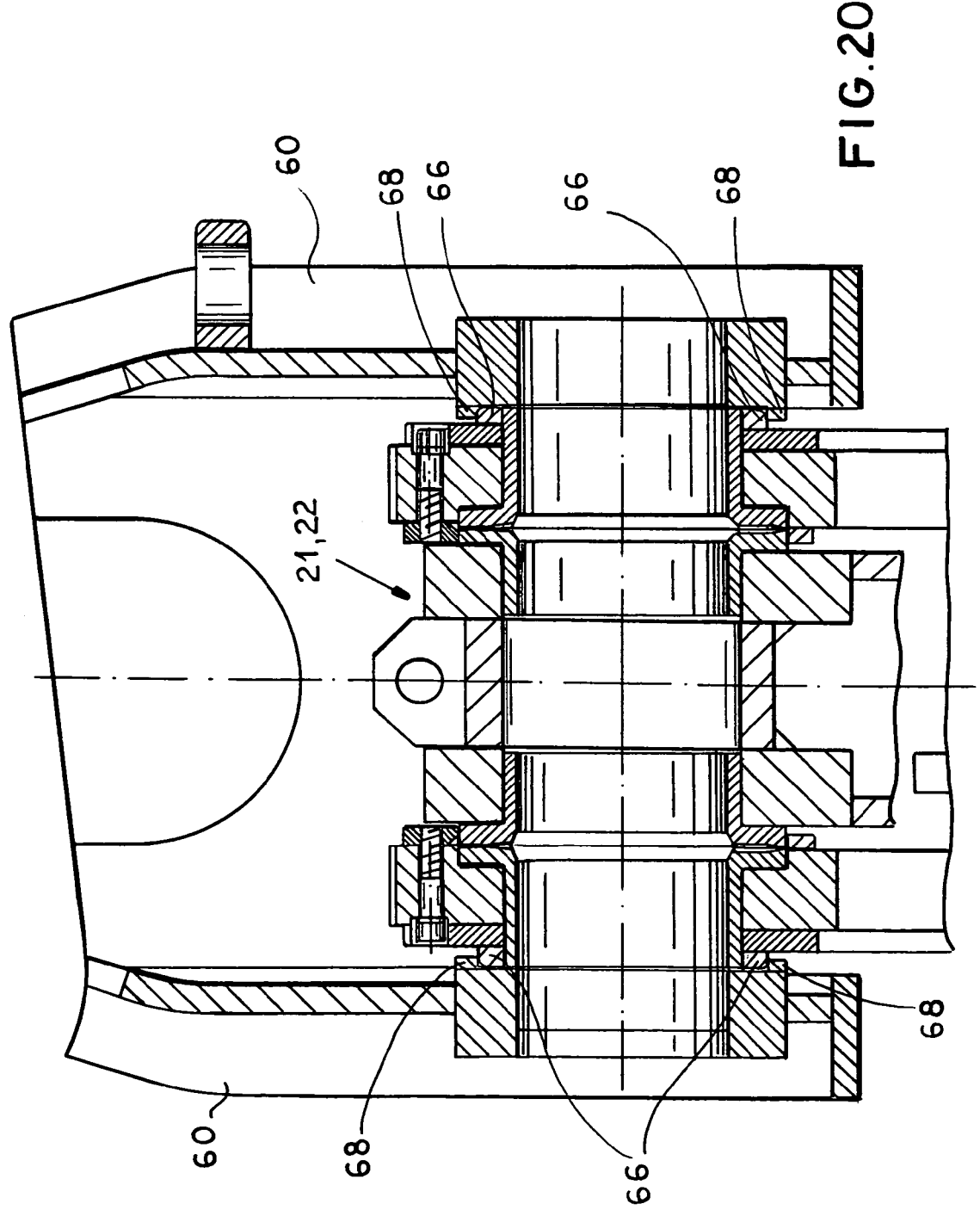
FIG. 20 is an axial section through a claw assembly having the elements shown in FIGS. 16, 17, 18, 19a, and 19b.

Instead of the structure of FIGS. 17 and 18, the support can be provided around each hole 23 with short bars 72, 73, and 74, with the bars 72 and 73 forming a flared mouth like the surfaces 69. Such a construction makes it easy to align the heavy jaw assembly in the support 60 during installation.

We claim:

1. A demolition claw comprising:
    a support;
    a pivot pin mounted on the support and centered on and extending along an axis;
    an inner jaw formed with a throughgoing hole;
    an outer jaw formed with a pair of fixed-together and similar side parts axially flanking the inner jaw and having coaxial holes aligned with the inner-jaw hole and inner faces axially confronting respective outer faces of the inner jaw, the pivot pin passing through the holes of the inner and outer jaws, whereby the jaws can pivot on the support about the axis;
    a respective arcuate formation fixed on each of the outer faces adjacent the respective hole, projecting axially therefrom toward the respective inner face, and generally centered on the axis;
    a respective retaining formation fixed on each of the inner faces adjacent the respective hole, projecting axially therefrom toward the respective outer face, radially offset from the arcuate formation, axially overlapping the arcuate formation, and surrounding the respective arcuate formation; and
    means removably fixing at least a part of each of the retaining formations on the respective inner face for releasably capturing the inner jaw in the outer jaw, whereby only when the part of the retaining formation is removed can the inner jaw be separated from the outer jaw.

2. The demolition claw defined in claim 1, further comprising
    means including structure on one of the jaws for preventing axial separation of the jaws.

3. The demolition claw defined in claim 2 wherein each arcuate formation is an annular ridge and each retaining formation is at least three abutments generally angularly equispaced about the axis.

4. The demolition claw defined in claim 3 wherein at least one of the abutments forms the part of the retaining formation and is a removable bolt.

5. The demolition claw defined in claim 2 wherein each arcuate formation is a circularly annular ridge and each retaining formation includes a semicircular annular ridge and an abutment generally diametrally opposite the semicircular ridge.

6. The demolition claw defined in claim 1 wherein the means includes bolts releasably retaining the removable parts of the retaining formations to the outer jaw.

7. The demolition claw defined in claim 2 wherein each arcuate formation has a generally cylindrical outer surface centered on the axis, the retaining formations each including
    a generally cylindrical outer surface centered on the axis;
    a ring engaged around one of the outer surfaces and projecting axially past the other outer surface; and
    means for releasably clamping the ring to the one surface.

8. The demolition claw defined in claim 7 wherein the one outer surface is of slightly greater diameter than the other outer surface.

9. The demolition claw defined in claim 7 wherein the one outer surface has an axial length at least equal to an axial length of the ring, whereby the ring can be pushed back on the one surface to allow the jaws to be separated.

10. The demolition claw defined in claim 2 wherein each arcuate formation includes a pair of diametrally opposite part-circular ridges each extending over less than 90° and each retaining formation includes a pair of diametrally opposite part-circular ridges each extending over less than 90° and an abutment between the retaining-formation ridges and angularly abuttable with the arcuate-formation ridges.

11. The demolition claw defined in claim 2, further comprising:
    means including guide formations on the support for centering the jaws on the axis.

12. The demolition claw defined in claim 11 wherein the guide formations include:
    a respective annular collar on an outside surface of each of the jaws around the respective hole; and
    a pair of radially open arcuate seats centered on the axis and receiving the collars.

13. The demolition claw defined in claim 12 wherein the collars have beveled edges.

14. The demolition claw defined in claim 12 wherein the seat has a pair of flared flanks.

15. The demolition claw defined in claim 12 wherein the seat has an angled floor.

16. The demolition claw defined in claim 1 wherein the arcuate formations are each unitarily formed with the inner jaw.

17. The demolition claw defined in claim 16 wherein the arcuate formations are each annular and centered on the axis.

18. The demolition claw defined in claim 16 wherein the retaining formations each include a circularly arcuate ridge formed unitarily with the outer jaw and having an angular dimension of at most 180°.

19. The demolition claw defined in claim 1 wherein the side parts are unitarily formed with each other and the inner faces are so spaced that, when the parts of the retaining formation are fixed to the inner faces, the inner jaw cannot move radially of the axis out of the outer jaw.

20. A demolition claw comprising:
    a support;
    a pivot pin mounted on the support and centered on and extending along an axis;
    two jaws each having a hole through which the pivot pin extends, whereby the jaws can pivot on the support about the axis, the jaws having adjacent the respective holes confronting flat faces;

an arcuate formation fixed on one of the faces adjacent the respective hole, projecting axially therefrom toward the other of the faces, generally centered on the axis, and including a pair of diametrally opposite part circular ridges each extending over less than 90°;

a retaining formation fixed on the other of the faces adjacent the respective hole, projecting axially therefrom toward the one face, radially offset from the arcuate formation, axially overlapping the arcuate formation, surrounding the arcuate formation, and including a pair of diametrally opposite part-circular ridges each extending over less than 90° and an abutment between the retaining-formation ridges and angularly abuttable with the arcuate-formation ridges; and means including structure on one of the jaws for preventing axial separation of the jaws.

* * * * *